United States Patent [19]

Wang

[11] Patent Number: 5,200,671

[45] Date of Patent: Apr. 6, 1993

[54] FILAMENT-FREE LAMP TUBE STRUCTURE

[76] Inventor: Chang-Tai Wang, No. 28, Lane 61, Su-Chung St., Ho-Ping Lee, Su-Lin Cheng, Taipei Hsien, Taiwan

[21] Appl. No.: 840,491

[22] Filed: Feb. 24, 1992

[51] Int. Cl.⁵ ............................................. H05B 41/29
[52] U.S. Cl. .................................. 315/209 R; 315/326; 313/631
[58] Field of Search ................. 315/39, 248, 313, 344, 315/326, 209 R; 313/631, 632, 326, 357

[56] References Cited

U.S. PATENT DOCUMENTS 4,748,383  5/1988  Houkes ................................ 315/248
5,043,627  8/1991  Fox ................................. 313/631 X Primary Examiner—David Mis
Attorney, Agent, or Firm—Browdy and Neimark

[57] ABSTRACT

A filament-free lamp tube having no filament while still achieving illuminating effect, comprising an electronic circuit, wherein AC power is rectified, filtered, oscillated and amplified to generate a high frequency which is directly input to two ends or positive/negative ends of the lamp tube so that electrons of the mercury vapor inside the lamp tube are energized to collide with the fluorescent wall of the lamp tube so as to emit light.

5 Claims, 4 Drawing Sheets

FILAMENT-FREE LAMP TUBE STRUCTURE

BACKGROUND OF THE INVENTION

The present invention relates to a filament-free lamp tube structure wherein an electronic circuit generates high frequency to directly energize the electrons inside the lamp tube to collide with the fluorescent tube wall thereof. The present invention can be widely applied to various lamp shapes such as an incandescent lamp bulb, a PL lamp tube, etc.

Various lamps such as fluorescent lamps, sun lamps, mercury lamps, PL lamps, etc. are widely used nowadays. Such lamp include a filament therein, a starter and a stabilizer to aid in the activation of the lamp and keep the current constant so as to make the lamp emit light. However, several shortcomings exist in such lamps as follows:

1. The filament is very apt to break and thus become unable to energize the electrons of the mercury vapor inside the lamp tube to collide with the fluorescent wall thereof so as to emit light. The broken filament thus must be replaced with a new one.

2. Once the starter is damaged, the waving time of the stabilizer cannot be prolonged. Such damaged starter cannot further aid in starting and reducing the starting fire time and eliminating noise.

3. The damage of the stabilizer will make the current unstable.

Therefore, the applicant has developed; a filament-free lamp tube without the above shortcomings existing in the prior art.

SUMMARY OF THE INVENTION

It is a primary object of this invention to provide a filament-free lamp tube in which no break or damage of the filament will take place.

It is a further object of this invention to provide the above lamp tube in which no starter and stabilizer is required so that the lamp can be lighted instantly without being affected by a reduction of the voltage.

It is still a further object of this invention to provide the above lamp tube which emits light even within the range of 65-70 V. The conventional lamp will be extinguished when the voltage is lowered to about 90 V.

It is still a further object of this invention to provide the above lamp tube in which no filament, starter and stabilizer is required so that the cost is lowered to meet the economic requirement.

According to the above object, the present invention includes a lamp tube having no filament, wherein an electronic circuit generates a high frequency signals which are directly input to two pins of the lamp tube to energize the electrons of an idle gas inside the lamp tube so as to collide with the fluorescent wall thereof to emit light. Such lamp tube is free from all the drawbacks of conventional lamp tubes.

The present invention can be better understood through the following description and accompanying drawings, wherein:

DETAILED DESCRIPTION OF THE PREFERRED EMBODIMENT

Figure 1:
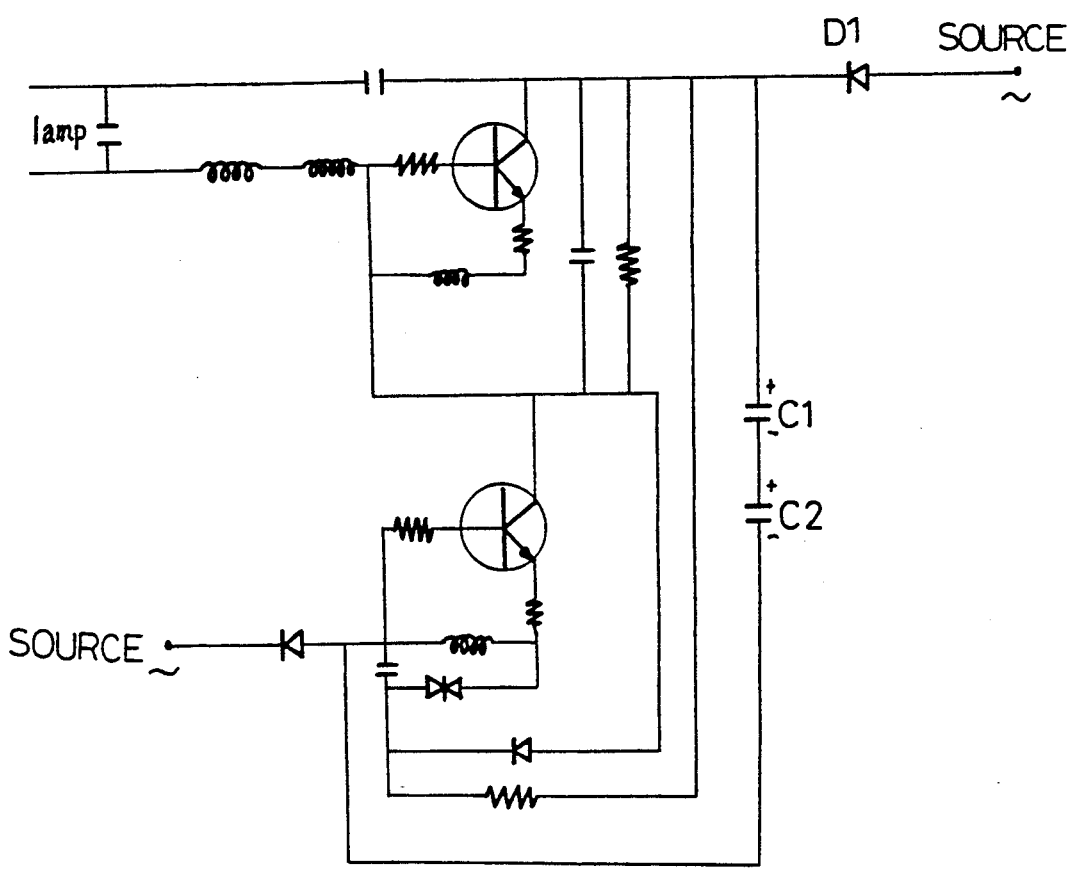
FIG. 1 is a circuit diagram of the present invention.
Figure 2:
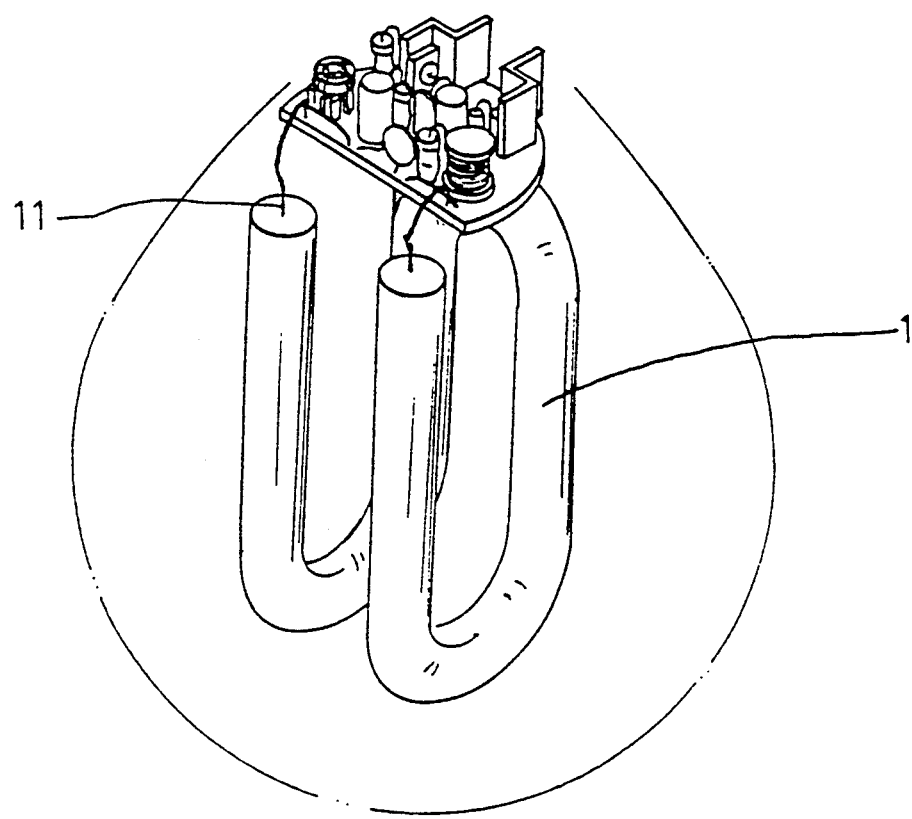
FIG. 2 is a perspective assembled view of the present invention.

Please refer to FIGS. 1 and 2. The present invention includes a circuit portion and a lamp tube. The circuit portion has two source ends supplying an AC power which is rectified by a rectifier diode D1 and goes through capacitors C1, C2 to input a DC power. By means of the parallel charging effect of an RC circuit, a pulse is generated. An oscillating circuit produces a frequency (f) which is amplified by an LC amplifying circuit into a high frequency which is directly input to two pins of a PL lamp. Meanwhile, the electrons of the lower pressure mercury vapor in the PL lamp tube are energized by the high frequency and the mercury vapor enhances the movement of the electron and aids in the activation of the lamp tube so that the electrons go back and forth to collide with the fluorescent wall of the lamp tube at high speed so as to emit light.

Figure 3:
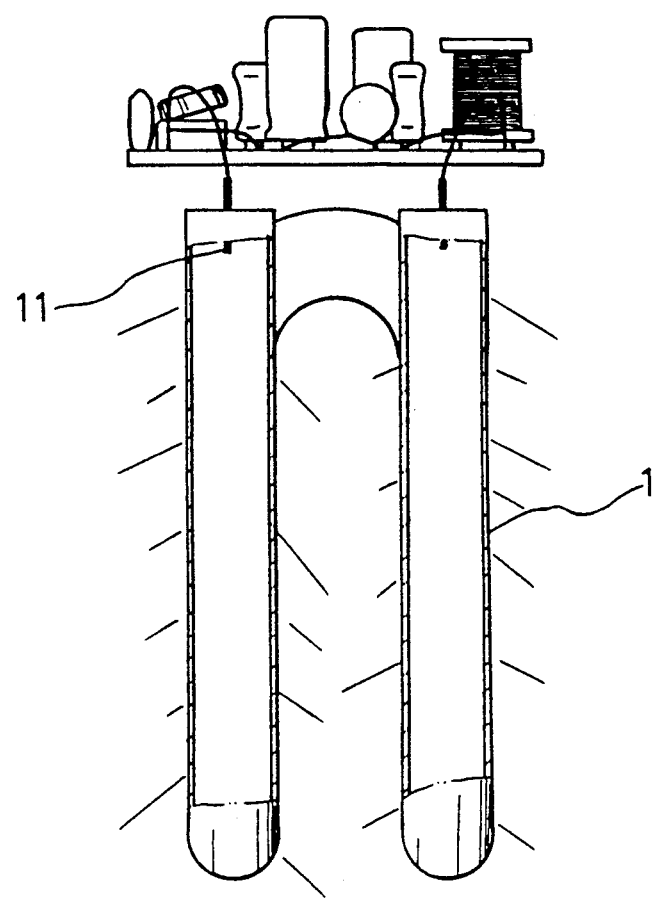
FIG. 3 is a partially sectional view of the present invention.
Figure 4:
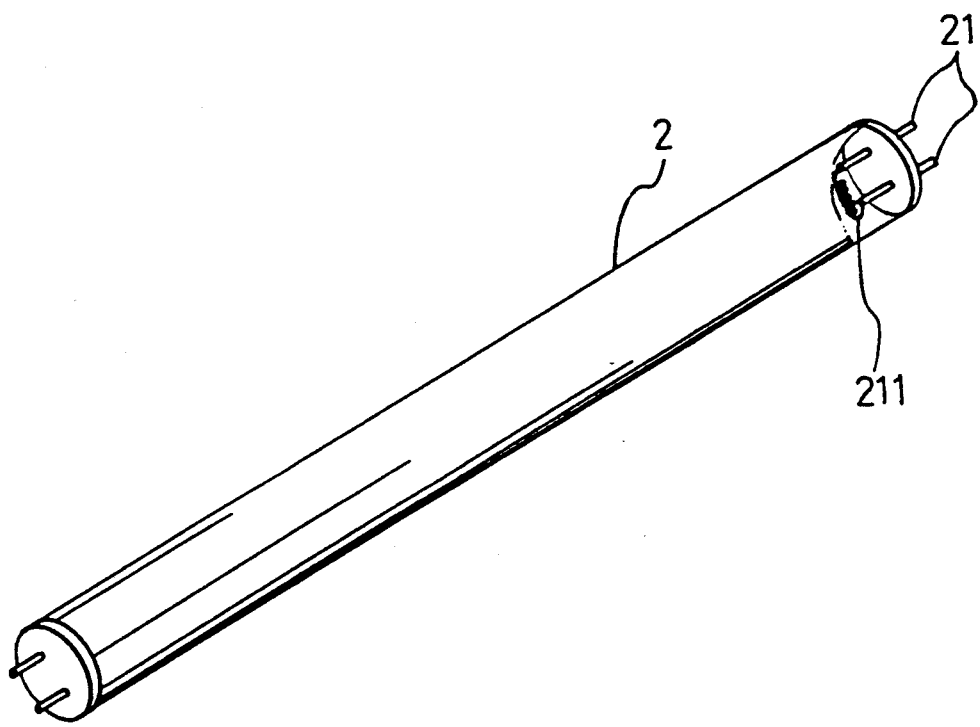
FIG. 4 shows a conventional lamp tube.

Please now refer to FIGS. 2 and 3. Each end of lamp tube 1 of this invention has only one leg 11. While as shown in FIG. 4, the conventional device has two pins 21 at each end and a filament 211 is connected between the two pins 21 inside the lamp tube 2. Therefore, in comparison with a conventional device, the present invention permits the electrons to collide the tube wall without additionally installing the filament 211.

Moreover, the present invention possesses advantages as follows:

1. Since no filament is required, no trouble will be caused due to the burn out of the filament.

2. Respecting the starter, because the high frequency of an electronic circuit is used to energize the lamp tube, no starter is required and the lamp tube can be turned on instantly. Also, the problem of flickering of the lamp tube when started can be eliminated.

3. Respecting the stabilizer, the weight and volume thereof are reduced and the stabilizing efficiency is improved so as to save electricity and achieve a high efficiency.

4. The present invention is free from the above elements so that the manufacturing cost is lowered to meet the economic requirement.

What is claimed is:

1. A filament-free lamp tube structure comprising
   a filament-free lamp tube having two pins without a filament between them, one on each end of said tube;
   an AC source;
   an electronic circuit including
      rectifying and filtering means connected to said AC source to rectify and filter said AC source,
      charging-discharging means to generate a pulse, connected to said rectifying and filtering means,
      oscillating and amplifying circuit means to produce a high frequency signal connected to receive said pulse,
   said pins of said filament-free lamp tube connected to receive said high frequency signal from said oscillating and amplifying circuit
   whereby said high frequency signal excites the electrons in said filament-free lamp tube to collide with the walls of said tube to generate light from said lamp tube.

2. The lamp tube structure as claimed in claim 1 wherein metal circular caps are fitted on and close said ends of said lamp tube.

3. The lamp tube structure as claimed in claim 1 wherein said lamp tube has a circular shape.

4. The lamp tube structure as claimed in claim 1 wherein said lamp tube has an irregular shape.

5. The lamp tube structure as claimed in claim 1 wherein said lamp tube has a rectilinear shape with a tube extending therethrough.

* * * * *